United States Patent
Sadeh

(10) Patent No.: US 6,697,525 B1
(45) Date of Patent: Feb. 24, 2004

(54) SYSTEM METHOD AND APPARATUS FOR PERFORMING A TRANSFORM ON A DIGITAL IMAGE

(75) Inventor: Roni M. Sadeh, Kfar Sabah (IL)

(73) Assignee: Parthusceva Ltd., Herzlia (IL)

( * ) Notice: Subject to any disclaimer, the term of this patent is extended or adjusted under 35 U.S.C. 154(b) by 0 days.

(21) Appl. No.: 09/166,109

(22) Filed: Oct. 2, 1998

(51) Int. Cl.⁷ .............................. G06K 9/36; G06K 9/38
(52) U.S. Cl. .................. 382/232; 382/250; 382/248; 382/251; 382/244; 382/246
(58) Field of Search ................... 382/232, 233, 382/234, 235, 236, 237, 238, 239, 240, 241, 242, 243, 244, 245, 246, 247, 248, 249, 250, 251, 252, 253; 348/403, 402, 407, 413, 416, 398

(56) References Cited

U.S. PATENT DOCUMENTS

| | | |
|---|---|---|
| 5,157,488 A | 10/1992 | Pennebaker |
| 5,168,375 A | 12/1992 | Reisch et al. |
| 5,319,724 A | 6/1994 | Blonstein et al. |
| 5,333,212 A | 7/1994 | Ligtenberg |
| 5,398,066 A | 3/1995 | Martinez-Uriegas et al. |
| 5,410,354 A | 4/1995 | Uz |
| 5,414,780 A | 5/1995 | Carnaham |
| 5,539,842 A | 7/1996 | Schwartz |
| 5,590,064 A * | 12/1996 | Astle ........................ 382/268 |
| 5,619,594 A | 4/1997 | Melen |
| 5,664,028 A | 9/1997 | Blonstein et al. |
| 5,671,156 A | 9/1997 | Weerackody et al. |
| H1684 H | 10/1997 | de Queiroz et al. |
| 5,675,424 A | 10/1997 | Park |

(List continued on next page.)

FOREIGN PATENT DOCUMENTS

| | | |
|---|---|---|
| EP | 513520 A3 | 11/1992 |
| EP | 537932 A2 | 4/1993 |
| EP | 537 932 A2 | 4/1993 |
| EP | 0 537 932 A2 | 4/1993 |
| EP | 577363 A1 | 1/1994 |
| EP | 0 577 363 A1 | 1/1994 |
| EP | 735772 A2 | 10/1996 |
| EP | 0 735 772 A2 | 10/1996 |
| EP | 762 775 A2 | 3/1997 |
| EP | 0 762 775 A2 | 3/1997 |
| EP | 814 614 A2 | 12/1997 |
| EP | 0 833 496 A2 | 4/1998 |
| EP | 833 496 A2 | 4/1998 |
| EP | 0 833 518 A2 | 4/1998 |

(List continued on next page.)

*Primary Examiner*—Phuoc Tran
*Assistant Examiner*—Amir Alavi
(74) *Attorney, Agent, or Firm*—Eitan, Pearl, Latzer & Cohen Zedek, LLP.

(57) ABSTRACT

The present invention is embodied in a data compression encoder for use with the discrete cosine transform compression process. The invention enhances compression using the discrete cosine transform by utilizing a prediction engine that breaks the data received into predicted and unpredicted portions. The predicted portions are excluded from the discrete cosine transform reducing the time-required to compress a file. The prediction engine relies, in part, upon look-up tables that are used to determine the predicted blocks. A table build engine and database compiler are used to create the look-up tables.

13 Claims, 12 Drawing Sheets

U.S. PATENT DOCUMENTS

| | | | |
|---|---|---|---|
| 5,675,666 A | | 10/1997 | Komuro et al. |
| 5,677,689 A | | 10/1997 | Yovanof et al. |
| 5,682,152 A | | 10/1997 | Wang et al. |
| 5,701,468 A | | 12/1997 | Benayoun et al. |
| 5,703,965 A | | 12/1997 | Fu et al. |
| 5,715,176 A | | 2/1998 | Mobini |
| 5,717,815 A | | 2/1998 | Nakano et al. |
| 5,719,958 A | | 2/1998 | Wober et al. |
| 5,724,446 A | | 3/1998 | Liu et al. |
| 5,734,755 A | | 3/1998 | Ramchuandran et al. |
| 5,734,892 A | * | 3/1998 | Chu ............................ 395/612 |
| 5,745,097 A | | 4/1998 | Cappels |
| 5,748,807 A | | 5/1998 | Lopresti et al. |
| 5,751,865 A | | 5/1998 | Micco et al. |
| 5,796,434 A | * | 8/1998 | Lempel ....................... 348/403 |
| 5,815,604 A | * | 9/1998 | Simons et al. ............... 382/250 |
| 5,870,036 A | * | 2/1999 | Franaszek et al. ............. 341/51 |
| 5,963,673 A | * | 10/1999 | Kodama et al. ............. 382/239 |
| 5,982,432 A | * | 11/1999 | Uenoyama et al. .......... 348/391 |
| 5,982,935 A | * | 11/1999 | Arbel .......................... 382/233 |
| 5,991,450 A | * | 11/1999 | Ohsawa et al. .............. 382/245 |
| 6,130,911 A | * | 10/2000 | Lei ........................ 375/240.16 |

FOREIGN PATENT DOCUMENTS

| | | |
|---|---|---|
| EP | 833 518 A2 | 4/1998 |
| EP | 833519 A2 | 4/1998 |
| EP | 0 833 519 A2 | 4/1998 |
| WO | WO 95/04434 | 2/1995 |
| WO | 95/04434 | 2/1995 |
| WO | 95/35628 | 12/1995 |
| WO | WO 95/35628 | 12/1995 |
| WO | 96/32691 | 10/1996 |
| WO | WO 96/32691 | 10/1996 |
| WO | 96/32811 | 10/1996 |
| WO | WO 96/32811 | 10/1996 |
| WO | 96/33574 | 10/1996 |
| WO | WO 96/33574 | 10/1996 |
| WO | WO 97/05748 | 2/1997 |
| WO | 97/05748 | 2/1997 |
| WO | 97/17669 | 5/1997 |
| WO | WO 97/17669 | 5/1997 |
| WO | 97/17675 | 5/1997 |
| WO | WO 97/17675 | 5/1997 |
| WO | 97/36428 | 10/1997 |
| WO | WO 97/36428 | 10/1997 |

* cited by examiner

| A | A | A | A | B | B | B | B |
|---|---|---|---|---|---|---|---|
| A | A | A | A | B | B | B | B |
| A | A | A | A | B | B | B | B |
| A | A | A | A | B | B | B | B |
| B | B | B | B | B | B | B | B |
| B | B | B | B | B | B | B | B |
| B | B | B | B | B | B | B | B |
| B | B | B | B | B | B | B | B |

FIG.4

| V00 | V01 | V02 | V03 | V04 | V05 | V06 | V07 |
|---|---|---|---|---|---|---|---|
| V10 | V11 | V12 | V13 | V14 | V15 | V16 | V17 |
| V20 | V21 | V22 | V23 | V24 | V25 | V26 | V27 |
| V30 | V31 | V32 | V33 | V34 | V35 | V36 | V37 |
| V40 | V41 | V42 | V43 | V44 | V45 | V46 | V47 |
| V50 | V51 | V52 | V53 | V54 | V55 | V56 | V57 |
| V60 | V61 | V62 | V63 | V64 | V65 | V66 | V67 |
| V70 | V71 | V72 | V73 | V74 | V75 | V76 | V77 |

FIG.5

| V00=<br>V00−V70 | V01=<br>V01−V71 | V02=<br>V02−V72 | V03=<br>V03−V73 | V04=<br>V04−V74 | V05=<br>V05−V75 | V06=<br>V06−V76 | V07=<br>V07−V77 |
|---|---|---|---|---|---|---|---|
| V10=<br>V10−V60 | V11=<br>V11−V61 | V12=<br>V12−V62 | V13=<br>V13−V63 | V14=<br>V14−V64 | V15=<br>V15−V65 | V16=<br>V16−V66 | V17=<br>V17−V67 |
| V20=<br>V20−V50 | V21=<br>V21−V51 | V22=<br>V22−V52 | V23=<br>V23−V53 | V24=<br>V24−V54 | V25=<br>V25−V55 | V26=<br>V26−V56 | V27=<br>V27−V57 |
| V30=<br>V30−V40 | V31=<br>V31−V41 | V32=<br>V32−V42 | V33=<br>V33−V43 | V34=<br>V34−V44 | V35=<br>V35−V45 | V36=<br>V36−V46 | V37=<br>V37−V47 |
| V40=<br>V00+V70 | V41=<br>V01+V71 | V42=<br>V02+V72 | V43=<br>V03+V73 | V44=<br>V04+V74 | V45=<br>V05+V75 | V46=<br>V06+V76 | V47=<br>V07+V77 |
| V50=<br>V10+V60 | V51=<br>V11+V61 | V52=<br>V12+V62 | V53=<br>V13+V63 | V54=<br>V14+V64 | V55=<br>V15+V65 | V56=<br>V16+V66 | V57=<br>V17+V67 |
| V60=<br>V20+V50 | V61=<br>V21+V51 | V62=<br>V22+V52 | V63=<br>V23+V53 | V64=<br>V24+V54 | V65=<br>V25+V55 | V66=<br>V26+V56 | V67=<br>V27+V57 |
| V70=<br>V30+V40 | V71=<br>V31+V41 | V72=<br>V32+V42 | V73=<br>V33+V43 | V74=<br>V34+V44 | V75=<br>V35+V45 | V76=<br>V36+V46 | V77=<br>V37+V47 |

FIG.6

| | | | |
|---|---|---|---|
| $D_{0,0,7}=$ | $(V_{00}-V_{70})$ | $-$ | $(V_{07}-V_{77})$ |
| $D_{1,0,7}=$ | $(V_{10}-V_{60})$ | $-$ | $(V_{17}-V_{67})$ |
| $D_{2,0,7}=$ | $(V_{20}-V_{50})$ | $-$ | $(V_{27}-V_{57})$ |
| $D_{3,0,7}=$ | $(V_{30}-V_{40})$ | $-$ | $(V_{37}-V_{47})$ |
| $D_{4,0,7}=$ | $(V_{00}+V_{70})$ | $-$ | $(V_{07}+V_{77})$ |
| $D_{5,0,7}=$ | $(V_{10}+V_{60})$ | $-$ | $(V_{17}+V_{67})$ |
| $D_{6,0,7}=$ | $(V_{20}+V_{50})$ | $-$ | $(V_{27}+V_{57})$ |
| $D_{7,0,7}=$ | $(V_{30}+V_{40})$ | $-$ | $(V_{37}+V_{47})$ |
| $D_{0,1,6}=$ | $(V_{01}+V_{71})$ | $-$ | $(V_{06}+V_{76})$ |
| ⋮ | ⋮ | | ⋮ |
| $D_{7,3,4}=$ | $(V_{33}+V_{43})$ | $-$ | $(V_{34}+V_{44})$ |

FIG.7A

| | | | |
|---|---|---|---|
| $S_{0,0,7}=$ | $(V_{00}-V_{70})$ | $+$ | $(V_{07}-V_{77})$ |
| $S_{1,0,7}=$ | $(V_{10}-V_{60})$ | $+$ | $(V_{17}-V_{67})$ |
| $S_{2,0,7}=$ | $(V_{20}-V_{50})$ | $+$ | $(V_{27}-V_{57})$ |
| $S_{3,0,7}=$ | $(V_{30}-V_{40})$ | $+$ | $(V_{37}-V_{47})$ |
| $S_{4,0,7}=$ | $(V_{00}+V_{70})$ | $+$ | $(V_{07}+V_{77})$ |
| $S_{5,0,7}=$ | $(V_{10}+V_{60})$ | $+$ | $(V_{17}+V_{67})$ |
| $S_{6,0,7}=$ | $(V_{20}+V_{50})$ | $+$ | $(V_{27}+V_{57})$ |
| $S_{7,0,7}=$ | $(V_{30}+V_{40})$ | $+$ | $(V_{37}+V_{47})$ |
| $S_{0,1,6}=$ | $(V_{01}+V_{71})$ | $+$ | $(V_{06}+V_{76})$ |
| ⋮ | ⋮ | | ⋮ |
| $S_{7,3,4}=$ | $(V_{33}+V_{43})$ | $+$ | $(V_{34}+V_{44})$ |

FIG.7B

GROUP 1 (G—,—)—VALUES THAT HAVE UNDERGONE ONLY SUBTRACTION

D0,0,7  D0,1,6  D0,2,5  D0,3,4
D1,0,7  D1,1,6  D1,2,5  D1,3,4
D2,0,7  D2,1,6  D2,2,5  D2,3,4
D3,0,7  D3,1,6  D3,2,5  D3,3,4

| DCT00 | DCT01 | DCT02 | DCT03 | DCT04 | DCT05 | DCT06 | DCT07 |
|---|---|---|---|---|---|---|---|
| DCT10 | DCT11 | DCT12 | DCT13 | DCT14 | DCT15 | DCT16 | DCT17 |
| DCT20 | DCT21 | DCT22 | DCT23 | DCT24 | DCT25 | DCT26 | DCT27 |
| DCT30 | DCT31 | DCT32 | DCT33 | DCT34 | DCT35 | DCT36 | DCT37 |
| DCT40 | DCT41 | DCT42 | DCT43 | DCT44 | DCT45 | DCT46 | DCT47 |
| DCT50 | DCT51 | DCT52 | DCT53 | DCT54 | DCT55 | DCT56 | DCT57 |
| DCT60 | DCT61 | DCT62 | DCT63 | DCT64 | DCT65 | DCT66 | DCT67 |
| DCT70 | DCT71 | DCT72 | DCT73 | DCT74 | DCT75 | DCT76 | DCT77 |

FIG.8

GROUP II (G−+)−VALUES THAT HAVE UNDERGONE FIRST SUBTRACTION AND SECOND SUBTRACTION

GROUP III (G+−)−VALUES
THAT HAVE UNDERGONE
FIRST ADDITION AND
SECOND SUBTRACTION

D4,0,7  D4,1,6  D4,2,5  D4,3,4
D5,0,7  D5,1,6  D5,2,5  D5,3,4
D6,0,7  D6,1,6  D6,2,5  D6,3,4
D7,0,7  D7,1,6  D7,2,5  D7,3,4

| DCT00 | DCT01 | DCT02 | DCT03 | DCT04 | DCT05 | DCT06 | DCT07 |
|---|---|---|---|---|---|---|---|
| DCT10 | DCT11 | DCT12 | DCT13 | DCT14 | DCT15 | DCT16 | DCT17 |
| DCT20 | DCT21 | DCT22 | DCT23 | DCT24 | DCT25 | DCT26 | DCT27 |
| DCT30 | DCT31 | DCT32 | DCT33 | DCT34 | DCT35 | DCT36 | DCT37 |
| DCT40 | DCT41 | DCT42 | DCT43 | DCT44 | DCT45 | DCT46 | DCT47 |
| DCT50 | DCT51 | DCT52 | DCT53 | DCT54 | DCT55 | DCT56 | DCT57 |
| DCT60 | DCT61 | DCT62 | DCT63 | DCT64 | DCT65 | DCT66 | DCT67 |
| DCT70 | DCT71 | DCT72 | DCT73 | DCT74 | DCT75 | DCT76 | DCT77 |

FIG.10

GROUP IV (G++)—VALUES
THAT HAVE UNDERGONE
ONLY ADDITION

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG.14

SYSTEM METHOD AND APPARATUS FOR PERFORMING A TRANSFORM ON A DIGITAL IMAGE

BACKGROUND OF THE INVENTION

A. Field of the Invention

The invention is related generally to a system for building data compression devices and more particularly, to a system for building a data compression device for coding of images.

B. Description of the Prior Art

With the advent of high speed low cost microprocessors, there has been a rapid growth in the development of digital communication devices for the transmission of print, voice and video. The rapid growth and demand for such devices has quickly out paced the ability of the present communications hardware infrastructure to provide communications bandwidth to meet the digital communication demands. In the field of digital communications systems, the amount of data capable of being transmitted through a given media over time is referred to as bandwidth.

One solution to expand available bandwidth is through the implementation of data compression techniques to reduce the amount of digital data needed to represent the information transmitted. Digital compression techniques currently represent the most common solution for increasing the throughput of digital communications hardware. Given the variations in hardware technology and digital computer platforms that exist in various industries and internationally, standards have been established to provide certain data compression techniques that may be implemented universally.

In field of image information systems where images or pictures are represented in a digital form by data, numerous commercially accepted standards have been developed for compressing such digital images. One such standard was developed by the Joint Photographic Experts Group (JPEG), an international body formed to establish an international standard for the compression of grayscale and color images. This compression standard has come to be known as the JPEG standard in which digital images are compressed through an encoder and represented in a compressed form known as JPEG format. Images stored in the JPEG format have a file size which is significantly smaller than the file size of the same digital image stored in an uncompressed form. The JPEG standard was recommended by the International Telegraph and Telephone Consultative Committee (CCITT) as recommendation T.81 on Sep. 18, 1992 and was published by the International Standards Organization and International Electrotechnical Commission (ISO/IEC) as standard ISO 10918:1 entitled, "INFORMATION TECHNOLOGY—DIGITAL COMPRESSION AND CODING OF CONTINUOUS-TONE STILL IMAGES—REQUIREMENTS AND GUIDELINES ITU-T Rec. T.81 | ISO 10918:1".

The JPEG standard actually comprises two classes of compression processes, namely, lossy and lossless compression techniques. In lossy compression, substantial compression is achieved while some loss of the image data occurs when the image is subsequently decompressed. However, such losses in image quality may be so minimal that they are generally not considered discernable when viewed by the naked eye. Those processes that are based upon the discrete cosine transform (DCT) are considered lossy. An encoder 20 (FIG. 1) using lossy compression generally includes a DCT engine 21, a quantizer 22 and an entropy coder 26. These functions are defined in the JPEG standard. In the second class, lossless compression is achieved using an alternative technique to DCT in which no loss in image quality occurs when the image is decompressed. However, lossless compression does not achieve compression ratios as large as lossy compression. Thus, digital images when compressed under a lossless compression will have a greater file size and will take more time to transfer through a communications line than the same image when compressed over the lossy standard. Except in fields where image accuracy is desired, such as, in medical imaging where any change in the representation of an image containing human tissue may affect the diagnosis of an illness by a medical professional, most image applications can utilize the lossy compression standard for digital transmission.

In some real time applications, such as, transmitting digital images between facsimile machines, the JPEG standard for compressing digital images is more than capable of simultaneously compressing the data in conjunction with the transmission of the images. This is due to the fact that the narrow bandwidth of conventional analog phone lines for digital data transmission is inherently slower than other digital communications methods and provides more than adequate time for the simultaneous JPEG compression processes to occur in real time. However, in other hardware communications systems that have improved digital throughput or have been designed for digital transmission, such as computer buses and networks as well as digital television systems, the availability and need for even greater throughput and speed is in demand. In communications systems such as digital television transmission, it will be realized by those skilled in the art that the Moving Pictures Experts Group (MPEG) standard for compressing and transmitting moving picture images which is based upon the JPEG standard is also limited by this time constraint. Moreover, faster methods are needed for compressing and storing JPEG images prior to when image data is transferred, for example, to personal computers (PCs) from peripheral devices or for use with the storing of images in digital cameras and the like. When conventional JPEG compression processes are used in such environments in real time, the compression time needed to convert digital images into the JPEG standard using conventional JPEG compression methods can slow down the overall transmission rate of such high speed communications systems.

Thus, it may be appreciated that the time saved in transferring such compressed files has been reduced in part by the time needed by conventional compression techniques to encode a digital image into the JPEG file format. Such time constraints limit the effectiveness of the JPEG file format in applications that require the compression and transmission to occur quickly, simultaneously and/or in real time.

Thus, the need exists for encoding and decoding devices and processes that can convert digital images between an uncompressed and compressed file standard, such as JPEG or MPEG, in real time and without delay while operating with high speed communications systems.

OBJECTS AND SUMMARY OF THE INVENTION

It is an object of the present invention to provide an image compression device and process that improves the conversion rates for encoding digital images between an uncompressed and compressed data standard.

It is another object of the present invention to provide an image compression device and process that improves conversion rates for digital transmission of compressed images using a lossy compression process.

It is yet another object of the present invention to provide an image compression device and process that reduces the time required for the discrete cosine transform (DCT) in the lossy compression process used to produce a compressed image under the JPEG standard.

An advantage of the present invention is the ability to provide a good quality image from a lossy compression process having improved compression rates.

Another advantage of the present invention is improved timing by eliminating DCT cycles not needed, but performed during conventional lossy compression.

A further advantage of the present invention is that it can be manufactured on an economical basis and has portability between various communication platforms.

A further advantage of the present invention is the capability to discriminate between types of uncompressed digital image data and to provide a lossy coding stage for a first set of image data and to perform conventional DCT on the second set of image data, thereby eliminating the need for use of the DCT on the first set of data.

It is a feature of the present invention to provide a compression device and process that substantially improves the transmission of data across communications link and that significantly increases the ability to establish and-maintain the realtime communication of images.

The present invention is embodied in a data compression system for transforming a data set from an uncompressed standard to a compressed standard in which the data set when stored on a storage media under the compressed standard requires less space than the data set when stored under the uncompressed standard. The system comprises a discrete cosine transform engine including means for apportioning the data set when uncompressed into a plurality of uncompressed blocks; an inference engine adapted to divide the blocks into predicted blocks and unpredicted blocks by manipulating each of the blocks according to predetermined criteria and comparing each of the manipulated blocks to a predetermined set of compressed block standards; means for assigning a selected one of a plurality of compressed blocks to each of the predicted blocks based upon the comparisons made by the inference engine; and the discrete cosine transform engine further including means for transforming said unpredicted blocks into compressed blocks; such that the data set may be stored under the compressed standard in which assigning the selected compressed block to the predicted block generally appears as though the predicted block was compressed by the transforming means.

The present invention includes a method of data compression for transforming a data set from an uncompressed standard to a compressed standard in which the data set when stored on a storage media under the compressed standard requires less space than the data set when stored under the uncompressed standard. The method comprises the steps of apportioning the data set when uncompressed into a plurality of uncompressed blocks; dividing the blocks into predicted blocks and unpredicted blocks by manipulating each of the blocks according to predetermined criteria; comparing each of the manipulated blocks to a predetermined set of compressed block standards; assigning a selected one of a plurality of compressed blocks to each of the predicted blocks based upon the comparisons; and transforming by a discrete cosine transform the unpredicted blocks into compressed blocks.

The present invention includes a data compression apparatus for transforming a data set from an uncompressed standard to a compressed standard in which the data set when stored on a storage media under the compressed standard requires less space than the data set when stored under the uncompressed standard. The apparatus comprises a discrete cosine transform engine including means for apportioning the data set when uncompressed into a plurality of uncompressed blocks; an inference engine adapted to divide the blocks into predicted blocks and unpredicted blocks by manipulating each of the blocks according to predetermined criteria and comparing each of the manipulated blocks to a predetermined set of compressed block standards; means for assigning a selected one of a plurality of compressed blocks to each of the predicted blocks based upon the comparisons made by the inference engine; and the discrete cosine transform engine further including means for transforming the unpredicted blocks into compressed blocks; such that the data set may be stored under the compressed standard in which assigning the selected compressed block to the predicted block generally appears as though the predicted block was compressed by the transforming means.

In another preferred embodiment, the present invention is embodied in a data compression system for transforming a digital image from an Y, Cb, Cr image data to a JPEG image data in which the digital image when stored on a storage media under the JPEG image data requires less space than the digital image when stored under the Y, Cb, Cr image data. The system comprises a discrete cosine transform engine including means for apportioning the digital image when uncompressed into a plurality of uncompressed 8×8 arrays; an inference engine adapted to divide the 8×8 arrays into predicted 8×8 arrays and unpredicted 8×8 arrays by manipulating each of the 8×8 arrays according to predetermined criteria and comparing each of the manipulated 8×8 arrays to a predetermined set of compressed 8×8 array standards; means for assigning a selected one of a plurality of compressed 8×8 arrays to each of the predicted 8×8 arrays based upon the comparisons made by the inference engine; and the discrete cosine transform engine further including means for transforming the unpredicted 8×8 arrays into compressed 8×8 arrays; such that the digital image may be stored under the JPEG image data in which assigning the selected compressed 8×8 array to the predicted 8×8 array generally appears as though the predicted 8×8 array was compressed by the transforming means.

In an alternatively preferred embodiment, the present invention is embodied in a data compression system for transforming a data set between an compressed standard in which the data set when stored on a storage media under the compressed standard require less space than the data set when stored under the uncompressed standard. The system includes a discrete cosine transform engine including means for selectively apportioning the data set when uncompressed into a plurality of uncompressed blocks; an inference engine adapted to divide the blocks into predicted blocks and unpredicted blocks by manipulating each of the blocks according to predetermined criteria and comparing each of the manipulated blocks to a predetermined set of compressed block standards; means for assigning a selected one of a plurality of compressed blocks to each of the predicted blocks based upon the comparisons made by the inference engine; the discrete cosine transform engine further including means for transforming the unpredicted blocks into compressed blocks; such that the data set may be stored under the compressed standard in which assigning the selected compressed block to the predicted block generally appears as though the predicted block was compressed by the transforming means; means for operating the discrete cosine engine, inference engine and means of assigning to transform the data set from the compressed standard to the uncompressed standard.

In yet another preferred embodiment, the present invention is embodied in a data compression system for transforming a data set from an uncompressed standard to a compressed standard in which the data set when stored on a storage media under the compressed standard requires less space than the data set when stored under the uncompressed standard. The system comprises a discrete cosine transform engine including means for apportioning the data set when uncompressed into a plurality of uncompressed blocks; an inference engine adapted to divide the blocks into predicted blocks and unpredicted blocks by manipulating each of the blocks according to predetermined criteria and comparing each of the manipulated blocks to a predetermined set of compressed block standards; means for assigning a selected one of a plurality of compressed blocks to each of the predicted blocks based upon the comparisons made by the inference engine; and the discrete cosine transform engine further including means for transforming the unpredicted blocks into compressed blocks; the inference engine including means: for dividing the blocks into sub-blocks and means for predicting certain combinations that appear regularly in side a sub-block; such that the data set may be stored under the compressed standard in which assigning the selected compressed block to the predicted block generally appears as though the predicted block was compressed by the transforming means.

These and other objects and advantages of the invention will become apparent from the following more detailed description when taken in conjunction with the accompanying drawings of illustrative embodiments.

BRIEF DESCRIPTION OF THE DRAWINGS

FIG. 4 is a flow chart of a data compiler routine.

FIG. 5 is a flow chart of a table build routine.

FIG. 6 is a table of a first set of preliminary DCT calculations.

FIG. 7 is a table of a second set of preliminary DCT calculations.

FIG. 8 is a table of the first group of data block cells representative of DCT coefficients.

FIG. 9 is a table of a second group of data block cells representative of DCT coefficients.

FIG. 10 is a table of a third group of data block cells representative of DCT coefficients.

Figure 11:
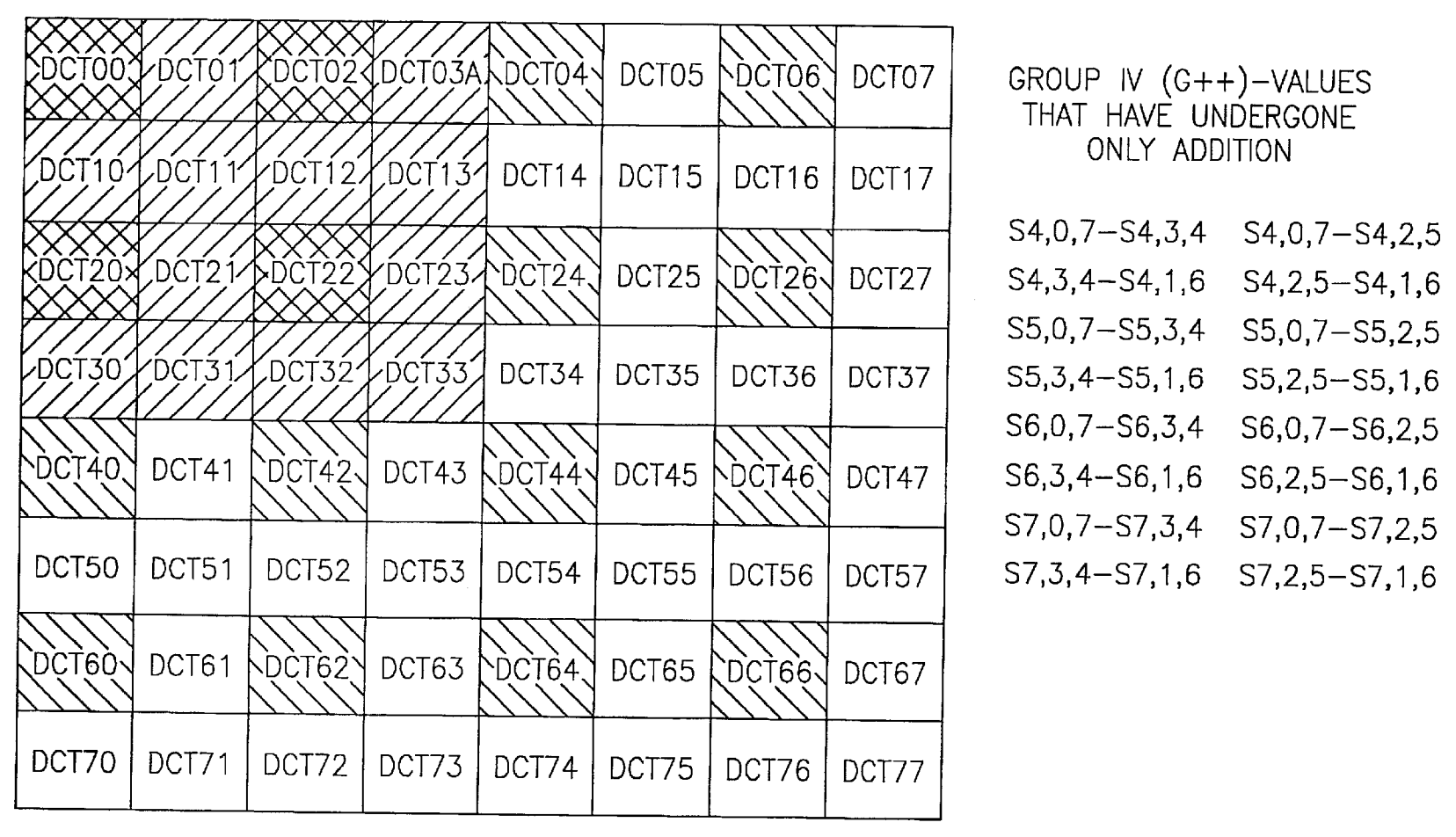

FIG. 11 is a table of a fourth group of data block cells representative of DCT coefficients.

FIG. 14 is a conventional zig-zag table.

DESCRIPTION OF THE PREFERRED EMBODIMENTS

Figure 1:
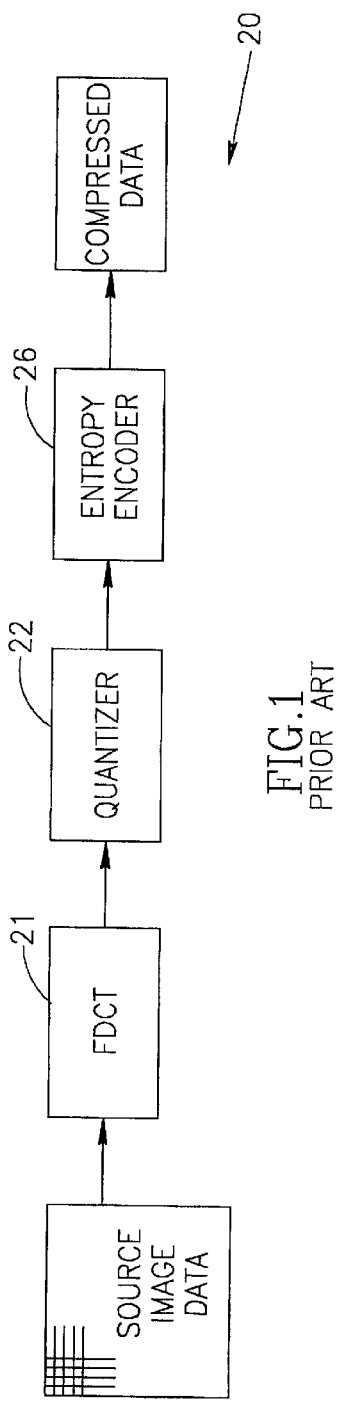
FIG. 1 is a block diagram of a JPEG encoder of the prior art.

In the following description, like reference numerals will be used to refer to like or corresponding elements in the different figures of the drawings for the purpose of illustration.

Figure 2:
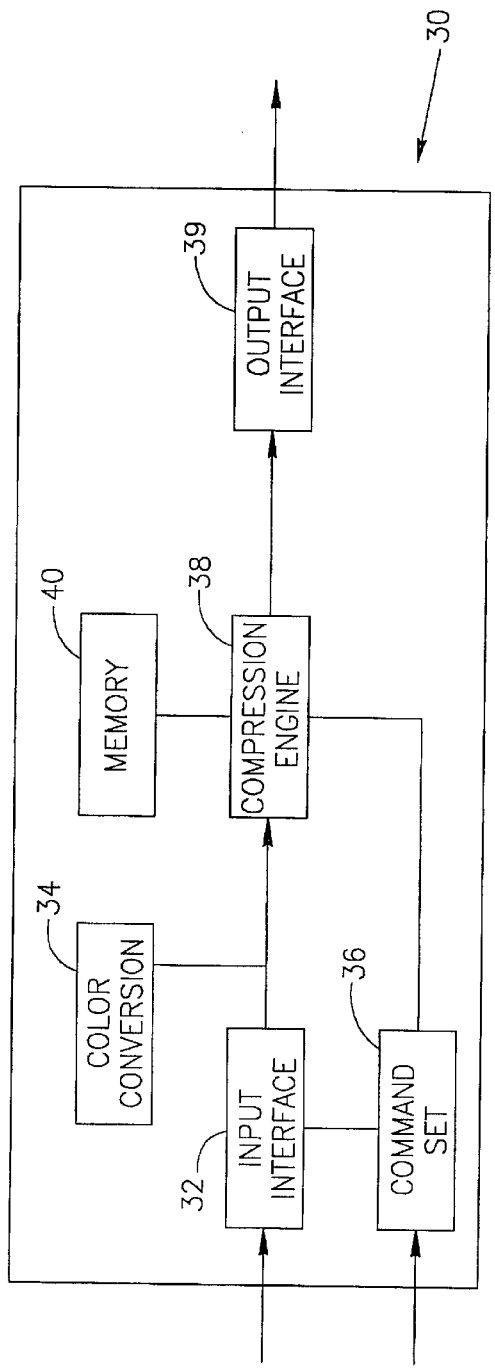
FIG. 2 is a block diagram of the JPEG encoder of the present invention.
Figure 3:
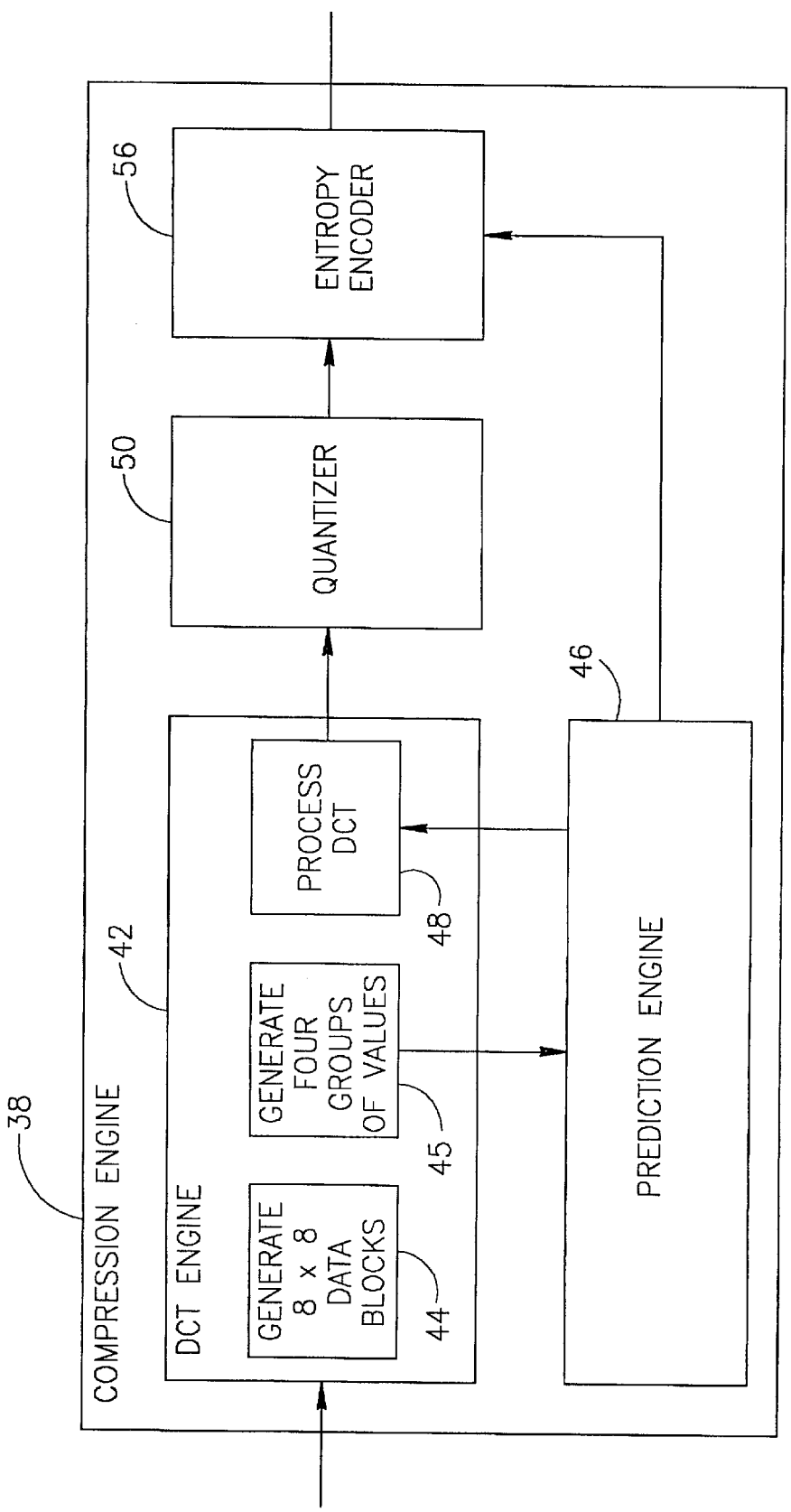
FIG. 3 is a block diagram of the encoder of the present invention.

With reference to FIGS. 2 and 3, the present invention relates generally to an encoder 30 having an input interface 32 to receive images in the form of uncompressed digital data. Since the images may be represented in a variety of color formats, such as, RGB and CMYK formats, a color conversion driver 34 converts color images, if needed, into the YCbCr format for color images as used by the JPEG standard. A conventional command set 36 of data values which are user selectable and disclosed in the JPEG standard allow for the user to select certain criteria during the compression process which, for example, allows the user to adjust the degree of compression desired in relation to the quality of the image desired. A compression engine 38, connected to a memory 40, receives the YCbCr format image data and the command set data values and compresses the image data according to criteria determined by the command set data values. The memory 40 preferably includes the program software and data used by the compression engine 38 to perform the compression process. The compression engine 38 connects to an output interface 39 which transmits the image in the compressed JPEG format to other devices. The encoder 30 of the present invention can be implemented in either a software or hardware configuration. It will be appreciated that the input and output interface may cooperate with either software or hardware implemented devices independently from the hardware and/or software implementation of the encoder 30.

The present invention further relates to a compression engine 38 (FIG. 3) which includes a DCT engine 42 which operates to first divide the image data into 8×8 pixel blocks 44 and then initializes the data for DCT 45. In the case of color images, each 8×8 grouping of pixels contains three 8×8 blocks of pixels representing the each of the color channels YCbCr. These 8×8 data blocks are divided up from the image in a conventional manner in accordance with the JPEG standard. Advantageously, following the division of the image data in blocks, the conventional compression process using the DCT engine is interrupted.

A prediction engine 46 receives each of the 8×8 data blocks and operates to divide up the blocks, or groups of three blocks in the case of color images, into predicted blocks and non-predicted blocks. The non-predicted blocks are returned to the DCT engine in which the non-predicted blocks are operated upon conventionally using the DCT transform 48 and a quantizer 50 according to the conventional JPEG standard. Advantageously, predicted blocks do not receive subsequent processing under the conventional DCT engine 42. Rather, the predicted blocks are coded by a prediction coding engine 46 which assigns a predetermined JPEG compressed block for the predicted block. For each of the predicted blocks a substantial time savings is achieved by eliminating the conventional processing of the block using the DCT engine 42 in which the repetitive process required for performing the discrete cosine transform is eliminated. The time required for the prediction engine to operate is significantly less than the DCT process. Thus, even if only a few of the data values for an image are predicted, a significant time savings is achieved.

In the preferred embodiment, the prediction engine may be implemented in two alternatively preferred embodiments. Namely, a zero prediction engine and a non-zero prediction engine that each predicts known combinations of data values which are known to occur regularly. The zero prediction engine process subjects each of the 8×8 data blocks to a series of tests to predict whether the blocks conform with known compression results in which all or most of the compressed values equal zero. In the non-zero prediction engine process, the data values are processed and compared to a set of known data values in which the compression results are known. If the data set in the second stage matches a set of the known data values, the compression results of that data set are assigned to the data values. It will be appreciated then that the prediction engine 46 may comprise either the zero prediction engine or the non-zero prediction engine. The selection of whether to use the zero prediction engine or non-zero prediction engine depends upon the implementation environment in which the encoder is used. Specifically, the non-zero prediction engine relies upon data table to predict the 8×8 data blocks. This requires additional memory which may exceed the memory capacity for conventional Digital Signal Processing (DSP) integrated circuits and thus requires a separate external memory. Where an external memory is undesirable, the zero prediction engine may be preferred.

Also the enhanced features of the DSP integrated circuit may influence selection. Some conventional devices are enhanced for vector addressing which is ideal for data tables. Other DSP circuits may have enhanced features which reduce the processing time of the zero-prediction engine. Thus, in determining whether to use a zero prediction engine or non-zero prediction engine, the designer must balance the hardware features of the processor and the memory capacity of the device. When space is a premium, a zero-prediction engine may be preferred. Where memory is available, the non-zero prediction engine may be preferred.

The prediction engine 46 produces three categories of data output: (1) predicted blocks, (2) non-predicted blocks and (3) partially predicted blocks. The predicted blocks are those 8×8 data blocks which were successfully predicted and which were pre-assigned with compression results. The non-predicted blocks are those blocks in which none of the data values were predicted and the data contained therein is tagged for the DCT process 48. The compression of the non-predicted blocks is accomplished conventionally using the DCT engine 42 and quantizer 50. The partially predicted blocks have a predicted part of the 8×8 data block that is assigned predetermined compression results. The non-predicted part of the 8×8 data block is tagged for compression conventionally using the DCT engine 42 and quantizer 50.

Processing of the data is completed by an entropy encoder 56, preferably based upon the Huffman compression algorithm in which the Huffman tables provided by the JPEG preferred embodiment, predicted blocks are not processed by the entropy encoder, as the compression results assigned to these blocks already include the entropy encoder 56 results. For partially predicted blocks, the Huffman tables may be modified to include results tailored to the partial compression results. However, the Huffman process operates in the manner described in the JPEG standard.

All the examples assume prediction in the B area: B1 ... B4 have a prediction value.

The zig-zag ordering of the DCT coefficients is shown in FIG. 14.

The numbers represent the final ordering of the DCT coefficients before the Huffman process begings.

Notice the coefficients 0 ... 9, 11 ... 13, 17, 18, 24 of FIG. 14 are in the "A" area. All other coefficients are in the "B" area.

The first example is: A1 ... A4 equals no prediction, B1 ... B4 equals prediction. There are several options depending on the size of the look up table created for the Huffman combinations.

The first option is to perform the regular Huffman until coefficient 24. From there, continue with the run length of zeros and the 4 prediction codes into a look-up table with 5 layers that will give as a result the complete. Huffman code from coefficient 24 to 64.

A second option is to take into account coefficients 1, 18, 24. Perform the regular Huffman coding process defined in the JPEG specification until coefficient 13. From there, continue with a run-length of zeros until coefficient 13, coefficients 17, 18, 24 and the 4 prediction codes into a look-up table. The result of the look-up table is a complete Huffman code from coefficient 13 to 64.

A second example is: A1 is predicted (coefficients 4, 11, 13, 24), A2 ... A4 equals not-predicted, B1 ... B4 equals predicted.

The first option is to perform the regular Huffman until coefficient 19. From there, continue with a run-length of zeros until coefficient 19 and the 5 prediction codes (A1, B1 ... B4) into a look-up table.

A second option is to perform the regular Huffman until coefficient 9. From there, continue with a run-length of zeros until coefficient 9 and the coefficients 12, 17, 18 and the 5 prediction codes (A1, B1 ... B4) into a look-up table.

A third example is: A1, A2 equal predicted (coefficients 2,4, 7,9,11,13,18,24), A3 ... A4 are not predicted, B1 ... B4 equal predicted.

The first option is to perform the regular Huffman coding process until coefficient 9. From there, continue with a run-length of zeros until coefficient 9, the coefficient 12, 17 and the 6 prediction codes (A1, A2, B1 ... B4) into a look-up-table.

Following processing by the entropy encoder 56, the image data, in a compressed form, is transmitted to the output interface 39 for use by other devices. The compressed data provided by the encoder 30 conforms to the JPEG standard. As such, any hardware or software device designed for use with conventional JPEG files may use the data provided by the present invention.

Predicted Engine—DCT Engine Preparation

With greater focus on the prediction engine of the preferred embodiment, the prediction engine operates by examining the data blocks after they have been prepared for processing by the DCT engine. Thus, it is first necessary to examine the initial steps provided conventionally by the DCT engine. As indicated above, the DCT engine divides the image file into 8×8 data blocks where each block contains 64 pixels of image information. In the case of color, there is a separate 8×8 data block for each component of the color image. The DCT engine further divides each of the 8×8 data blocks up into four groups of preliminary DCT computation values, each group being made up of 16 values. The selection of the groups and their make-up is determined according to the quantization table selected. The selection of the quantization table is related to the image quality and compression ratio of the compressed data file and may vary. In the preferred embodiment, a quantization table is selected, as shown in FIG. 4, where quantization constants A=4 and B=16 will provide an image quality in which image loss is generally below the threshold detectable by the human eye and on average provides a compression ratio of 1:8. This particular quantization table is desired for the zero prediction stage.

Processing of the data values into the 4 groups of data values coefficients occurs in the conventional manner by the DCT engine. The 8×8 block of data from where the 4 groups are derived is illustrated in FIG. 5 where each pixel of information is represented by a value V(ij), where rows 0 to 7 are represented by "i" and columns 0 to 7 are represented by "j". Determining the DCT coefficients for the present quantization table is initiated by subtracting and adding the components of each column in the following way (where "D" values represent difference or subtraction steps and "S" values represent summation or addition steps):

For j=0 to 7:

| | |
|---|---|
| D07j = V0j − V7j | S07j = V0j + V7j |
| D16j = V1j − V6j | S16j = V1j + V6j |
| D25j = V2j − V5j | S25j = V2j + V5j |
| D34j = V3j − V4j | S34j = V3j + V4j |

With reference to FIG. 6, the results of the computations are saved in the same 8×8 matrix format for each column:

V0j=D07j
V1j=D16j
V2j=D25j
V3j=D34j
V4j=S07j
V5j=S16j
V6j=S25j
V7j=S34j

It will be appreciated by those skilled in the art that this process is highly parallel in nature whether conducted by hardware or software implementations in which computations on different columns can be performed simultaneously. The 8×8 matrix formed by this process includes a subtraction group and an addition group, each group comprises an 8×4 matrix of 32 values.

In order to further subdivide these groups addition and subtraction steps are performed on the 8×8 matrix of FIG. 6 between columns as shown in FIGS. 7A and 7B. The result is 64 values that are divisible into the following groups as illustrated by FIGS. 8–11.

Group I includes 16 values that have undergone only subtraction and are identified as G(−)(−). As illustrated by FIG. 8, Group I is defined as: For j=0 to 3:D0,j,7-j, D1,j,7-j, D2,j,7-j, D3,j,7-j. These 16 values correspond uniquely as a group to the values of 16 DCT coefficients arranged as shown in FIG. 8 in an 8×8 DCT coefficient matrix. The prediction engine does not require one to one correspondence between the Group I values and the 16 DCT coefficients. It is merely sufficient that these values collectively correspond to the 16 DCT coefficients located in the positions shown in the matrix.

Group II includes 16 values that have undergone first subtraction and second addition and are identified as G(−)(+). As illustrated by FIG. 9, Group II is defined as: For j=0 to 3: S0,j,7-j, S1,j,7-j, S2,j,7-j, S3,j,7-j. These 16 values correspond uniquely as a group to the values of 16 DCT coefficients arranged as shown in FIG. 9 in the 8×8 DCT coefficient matrix. It should be noted that as in group I, that there is no one-to-one correspondence required of the values.

Group III includes 16 values that have undergone first addition and second subtraction and are identified as G(+)(−). As illustrated by FIG. 10, Group III is defined as: For j=0 to 3:D4,j,7-j, D5,j,7-j, D6,j,7-j, D7,j,7-j. These 16 values correspond uniquely as a group to the values of 16 DCT coefficients arranged as shown in FIG. 10 in the 8×8 DCT coefficient matrix.

Group IV includes 16 values that have undergone only addition and are identified as G(+)(+). Group IV is defined as: For j=0 to 3:S4,j,7-j, S5,j,7-j, S6,j,7-j, S7,j,7-j. Unlike the Groups I–III, Group IV is subjected to a third operation in which a subtraction step of the 16 values is performed as follows:

For I=4 to 7
  Si,0,7-Si,3,4
  Si,0,7-Si,2,5
  Si,3,4-Si,1,6
  Si,25-Si,1,6

As illustrated by FIG. 10, these 16 values correspond uniquely as a group to the values of 16 DCT coefficients arranged as shown in FIG. 10 in the 8×8 DCT coefficient matrix.

Zero Prediction Engine

Figure 12:
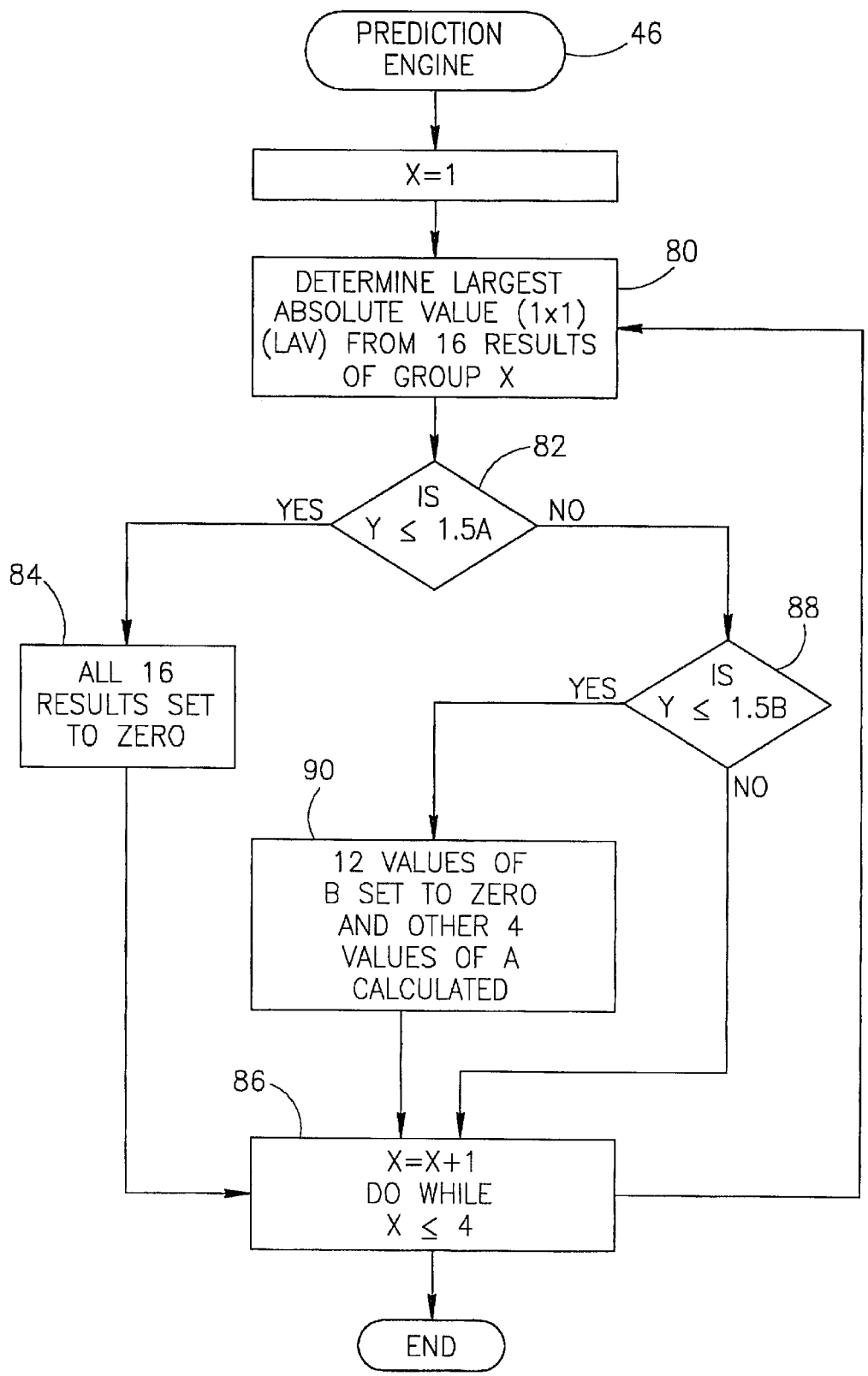
FIG. 12 is a flow chart of a zero prediction routine.

The computation of the four groups corresponding to 4 sets of 16 DCT coefficients are all computed conventionally by the DCT engine as a preliminary step in performing the discrete cosine transform on the 8×8 data block. However, before such calculations by the DCT engine begins, the prediction engine performs prediction operations on the four groups. A zero prediction operation is outlined by FIG. 12 in which a zero prediction test is performed on each of the four Groups. For each group, the process first determines the Largest Absolute Value (LAV) of the 16 results at step 80.

This determination can be performed using any conventional sorting or comparing technique in which the absolute value is determined. For example, the process may include the following steps:

Define the 16 values of Group X as GroupX(y), where y=1 to 16 and X=1 to 4.
Define LAV as the largest absolute value.
LAV=ABS (GroupX(1))
For y=2 to 16
If LAV<GroupX(y) then LAV=ABS (GroupX(y))
Next y
End As shown above, a quick comparison of the 16 values serially starting with the first value GroupI(x) results in LAV containing the largest absolute value of the group following the fifteen cycles. Those skilled in the art will appreciate that there are numerous other conventional methods for determining the largest absolute value from a data set. For some hardware digital signal processing integrated circuits, this absolute value is a hard wired command within the circuit.

Upon determining the largest absolute value (LAV), the LAV is compared to determine whether the LAV is smaller or equal to 1.5 times the quantization constant A at step 82. In the preferred embodiment, A is equal to 4 and the LAV is compared to determine if LAV≦6. If LAV is less than or equal to 1.5*A, then all the results for Group X are set to zero at step 84 and the next Group is processed at step 86. Otherwise, the program continues testing of the data.

The next test at step 88 compares whether LAV is less than or equal to 1.5 times the quantization value B. In the preferred embodiment quantization value B=16, so the LAV is compared at step 88 to determine if LAV≦18. If LAV is less than or equal to 1.5*B, then the twelve values that correspond to B are set to zero at step 90 and the four remaining values of the 24 values are tagged for calculation by the conventional DCT. The DCT engine may be initiated by either an interrupt during operation of the prediction engine or upon completion. The decision as to when to implement the DCT engine is a matter of design and depends upon the operation environment of the prediction engine. The program then calls then next Group(X) at step 86. Otherwise, if the LAV is greater than 1.5*B, no predicted result is reached and all of the 16 values are tagged for compression conventionally by the DCT process. The program then calls the next Group (X) at step 86. Upon completion of the prediction engine 46 for group 4, the portions of the data block that are tagged for conventional DCT processing are transmitted to the DCT engine at step 42 for further processing. Again, it will be appreciated that the values tagged for traditional DCT processing 48 may be transmitted at any time after to discovery to provide parallel processing of the DCT engine 42 while the prediction engine 46 finishes its sequence.

Non-Zero Prediction Engine

Figure 13:
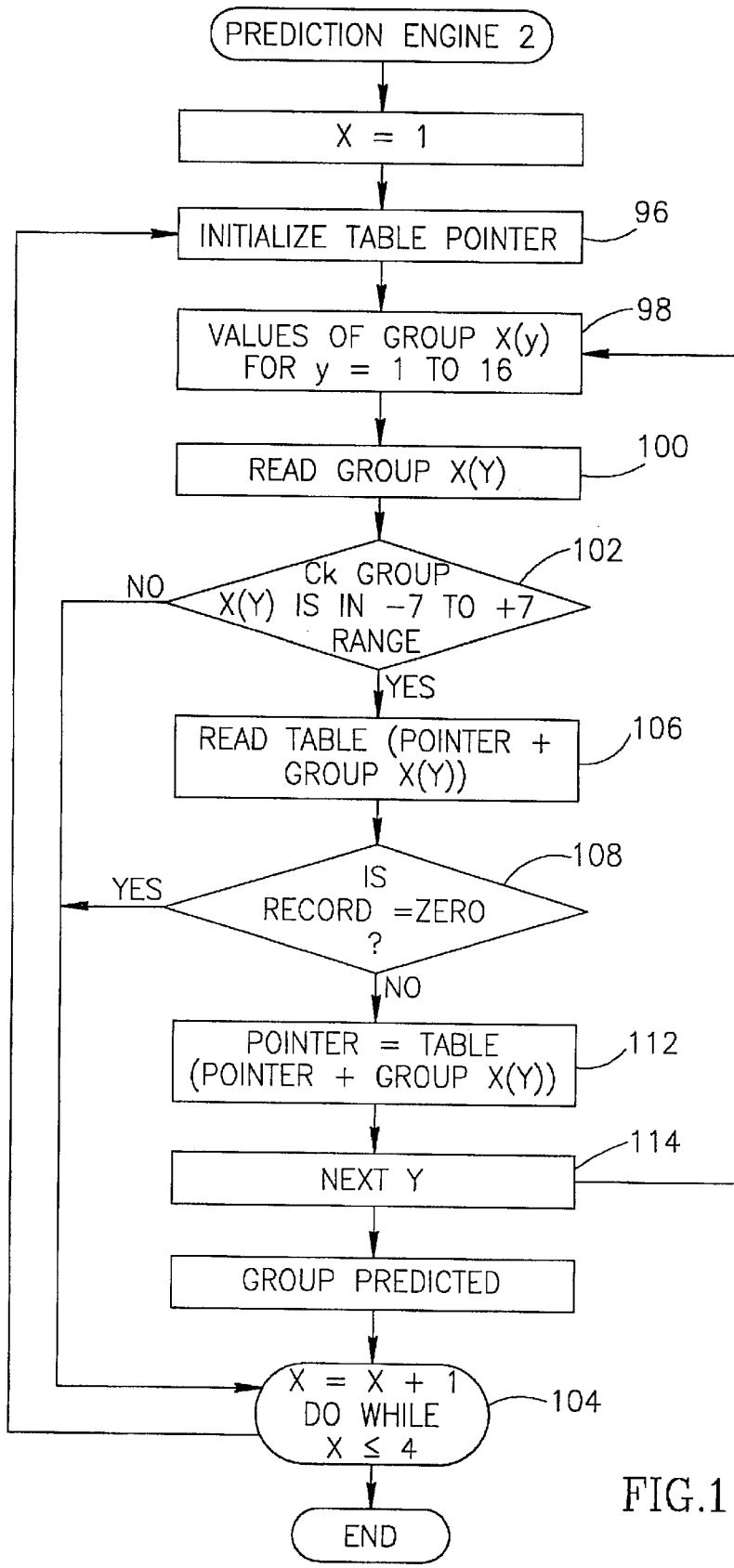
FIG. 13 is a flow chart of a non-zero prediction routine.

As indicated above the non-zero prediction engine can be implemented as an alternative to the zero prediction engine. With reference to the flow chart of FIG. 13, the non-zero prediction engine process has a series of look-up tables where each table corresponds to one of the 16 values from the GroupX. A table pointer is used in a conventional manner to navigate through the tables. Upon entering the non-zero prediction routine, the table pointer is initialized at step 96 for reading the first of the 16 values. Next, the non-zero prediction process enters a loop for each of the GroupX values at step 98 starting with the GroupX(y), where y=1 to 16. For each of the 16 values, the value is read at step 100. The magnitude of the GroupX(y) value is converted to a correspond to a range of −7 to +7. A check is made at step 102 to determine whether the value fell within the desired range. If the value is within the desired range, the program continues. Otherwise the program exits at step 104 and no prediction is made. Following the check for range step 102, the GroupX(y) value is added to the pointer value and used to look-up a record within the table at step 106. A check is made of the record value at step 108. If the record is "zero", then there is no prediction of the GroupX. The programs calls the next group of values at step 110. Otherwise, if the value is not equal to zero, the pointer is set to the table record value at step 112. The next value of GroupX is called at step 114 and steps 100 to 114 are repeated until all 16 values have been processed. Following the successful collection of 16 non-zero table records, the pointer during the processing of GroupX(16) is assigned a prediction code corresponding to a compressed data for GroupX. If the prediction engine has been successful, then all of the GroupX values are predicted values and no DCT processing of Group X is required.

Criteria For Stage Two Table Records

As apparent to one of ordinary skill in the art, the stage two 54 sequence performed by the prediction engine is a conventional look-up table sequence. The time saving performance achieved from stage two 54 is acquired from the simplicity of the stage two steps and the creation of the look-up tables which allows for the stage two process to predict non-zero blocks. It will further be appreciated that the look-up table may vary according to the application specific criteria such as whether the prediction engine is implemented in hardware and/or software. Further, the tables are tailored to the quantization method used.

In general the following basic assumptions are used to create the look-up tables:

1. The JPEG standard compresses information by assuming that certain combinations of DCT coefficients consist of more than 90% on average of the results in a given matrix of 8×8 DCT coefficients.
2. These common combinations are expressed by a small number of bits in the Huffman table included in the entropy encoder.
3. Based on these facts, it is possible to select a small number of combinations for each group of 16 values as prepared, for example, by the DCT engine above.
4. For each Group certain zero-one combinations for the "B" area FIG. 5 and higher combinations such as −7 to 7.
5. The general rule for selecting the common combinations is based upon the JPEG Huffman table provided by the JPEG Standard. For the "B" area, some of the common combinations consist of one coefficient being equal to 1 or −1 and the other 11 values of the 12 comprising the B area are zero. This occurrence provides a total of 24 combinations that share this common featured.
6. Surprisingly, it was discovered that, upon examining the 16 values that make up one of the four Groups, there are a relatively small number of common combinations that correspond to the common DCT combinations. A system for building a prediction engine having look-up tables is disclosed in U.S. patent application Ser. No. 09/165,535, filed Oct. 2, 1998, Publication No. U.S. 2002/0001414 and is incorporated herein by reference.

Following processing of the DCT coefficients conventionally, it is possible to optimize the Huffman tables. First assign prediction codes for the A and B area for each group. For example, Group I prediction codes are A1, B 1, Group II prediction codes are A2, B2 and so on. Thus, there are prediction codes assigned to each group in which one prediction value may mean no prediction.

It will be appreciated from the above examples that a look-up table may be created based on predicted and unpredicted results that will produce as a result a complete Huffman code from a certain point until the end. This table would further expedite processing of the Huffman coding system for partially predicted blocks of data.

Uses For The Encodes

The encoders incorporating the prediction engine of the present invention may be used in a variety of image processing devices such as optical scanners, digital cameras, digital video disk drives, and the like. The implementation can be accomplished in either a hardware form where the encoder is embodied in a conventional Digital Signal Processor (DSP). Alternatively, the encoder may be implemented in software for use with software applications on general purpose computers. In software, the encoder can be used in applications such as: Internet Browsers, Image Viewers and MPEG players.

In one preferred application, the encoder is included with the communication chip-set for an optical scanner. The encoder with the time saving prediction allows for the scanner to provide compressed JPEG images to a storage media at a significantly faster rate than conventional Tiff file formats or when using conventional JPEG encoders.

In a second preferred application the encoder is implemented in a digital camera when memory space is a premium. The encoder speeds up the transfer and storage of JPEG images to the camera's internal memory. This allows for the digital camera to be used in a manner that emulates conventional auto advancing camera's rapid-shoot cameras.

Hard Drive Composition

It will be appreciated that the prediction engine of the present invention may be used in conjunction with other compression applications. For example, in the storage of data on a hard drive in which a hard drive controller handles the, storage and transfer of data between a storage media and a computer bus in real time.

In such an application, it is desirable to identify and store various types of data before adding it to the hard drive. The types of data considered may include but are not limited to binary files, text files, graphics files, and compressed binary files which may include text, binary or graphic matter. The identification and compression must occur in real time and should cause a delay in data transfers between the computer bus and hard drive. In such an application, upon identifying the format of the data, an encoder equipped with a prediction engine may be used to compress the data.

It will be appreciated that the prediction engine second embodiment using tables may be used to develop encoders for binary text and compressed files as well as image files. Such prediction engines would follow similar selection criteria but would require an additional selection of a compression method and a selection of data representative of that format or type of data. The criteria for the prediction engine would also need to consider the capacity and speed of the hard drive controller in selecting the type of prediction engine contemplated.

What has been disclosed is merely illustrative of the present invention. Other arrangements and methods can be implemented by those skilled in the art without departing from the spirit and scope of the present invention.

It will be understood that certain features and subcombinations are of utility and may be employed without reference to other features and subcombinations as they are outlined within the claims. While the preferred embodiment and application of the invention has been described, it is apparent to those skilled in the art that the objects and features of the present invention are only limited as set forth in the claims attached hereto.

What is claimed is:

1. An image transform system comprising an apportioning module adapted to apportion an uncompressed data set representing an image into a plurality of uncompressed blocks, an inference engine adapted to manipulate at least one of said uncompressed blocks according to a predetermined criteria and to calculate a correlation value between at least one uncompressed block and at least one of a predetermined set of compressed blocks, such that a compressed block is assigned to an uncompressed block if the correlation value between the compressed block and the uncompressed block is above a predefined threshold, and a transform engine adapted to perform a transform function on an uncompressed block not having an assigned compressed block.

2. The system according to claim 1, wherein the number of calculations required to assign a predetermined compressed block to an uncompressed block are less than the number of calculations required by a transform engine to perform a transform function to the uncompressed block.

3. The system according to claim 1, wherein the transform engine is adapted to transform an uncompressed block according to a JPEG or MPEG standard.

4. The system according to claim 1, wherein said transform engine is a Huffman transform engine.

5. A method of performing a transform on a data set representing an image, said method comprising apportioning the uncompressed data set into a plurality of uncompressed blocks, manipulating at least one of said uncompressed blocks according to a predetermined criteria, calculating a correlation value between the at least one uncompressed block and at least one of a predetermined set of compressed blocks, assigning a compressed block to an uncompressed block if the correlation value between the compressed block and the uncompressed block is above a predefined threshold, and performing a transform function on an uncompressed block not having an assigned compressed block.

6. The method according to claim 5, wherein the calculations required for assigning a predetermined compressed block to an uncompressed block is less than the calculations required to perform a transform function on the uncompressed block.

7. The method according to claim 5, wherein the predetermined compressed blocks are compressed according to a JPEG standards.

8. The method according to claim 5, wherein each uncompressed block of data includes a plurality of data cells, each cell defined by a row and a column, said manipulating step including:

adding and subtracting from each of said columns of each of said blocks selected cell pairs to obtain a first set of results and storing said set of results within said cells of each of said columns.

9. The method according to claim 8, wherein said manipulating step includes:

adding and subtracting from said column of each of said blocks selected cell pairs containing said first set of results to obtain a second set of results of said columns.

10. An image transform apparatus comprising an apportioning module adapted to apportion an uncompressed data set representing an image into a plurality of uncompressed blocks, an inference engine adapted to manipulate at least one of said uncompressed blocks according to a predetermined criteria and to calculate a correlation value between the at least one uncompressed block and at least one of a predetermined set of compressed blocks, such that a compressed block is assigned to an uncompressed block if the correlation value between the compressed block and the uncompressed block is above a predefined threshold, and a transform engine adapted to perform a transform function on an uncompressed block not having an assigned compressed block.

11. The apparatus according to claim 10, wherein the number of calculations required to assign a predetermined compressed block to an uncompressed block is less than the number of calculations required by a transform engine to perform a transform function to the uncompressed block.

12. The apparatus according to claim 10, wherein the transform engine is adapted to transform the uncompressed blocks according to a JPEG or MPEG standard.

13. The apparatus according to claim 10, further comprising a Huffman transform engine adapted to code an un compressed block.

* * * * *